United States Patent
Nakayama et al.

(10) Patent No.: US 8,323,761 B2
(45) Date of Patent: Dec. 4, 2012

(54) LAMINATE SHEET AND LAMINATE SHEET ROLL

(75) Inventors: Takehito Nakayama, Tokyo (JP); Kazuya Katoh, Tokyo (JP); Takuya Hayasaka, Tokyo (JP)

(73) Assignee: Lintec Corporation, Tokyo (JP)

( * ) Notice: Subject to any disclaimer, the term of this patent is extended or adjusted under 35 U.S.C. 154(b) by 967 days.

(21) Appl. No.: 11/884,467

(22) PCT Filed: Feb. 3, 2006

(86) PCT No.: PCT/JP2006/301833
§ 371 (c)(1),
(2), (4) Date: Feb. 26, 2008

(87) PCT Pub. No.: WO2006/087921
PCT Pub. Date: Aug. 24, 2006

(65) Prior Publication Data
US 2009/0208688 A1    Aug. 20, 2009

(30) Foreign Application Priority Data
Feb. 21, 2005    (JP) .................................. 2005-043758

(51) Int. Cl.
*B32B 3/30*    (2006.01)
*B32B 3/02*    (2006.01)
*B65D 65/28*    (2006.01)
*G09F 3/00*    (2006.01)

(52) U.S. Cl. ...................... 428/40.1; 428/42.1; 428/42.2; 428/42.3; 428/43; 428/98; 428/156; 428/167; 428/192

(58) Field of Classification Search .................. 428/40.1, 428/42.1–43, 98, 156, 167, 192
See application file for complete search history.

(56) References Cited

U.S. PATENT DOCUMENTS
6,306,485 B1 *  10/2001  Keller ........................... 428/194
7,824,752 B2 *  11/2010  George ......................... 428/40.1
2004/0005428 A1   1/2004  Katoh et al.

FOREIGN PATENT DOCUMENTS
JP    A-58-049773    3/1983
JP    A-06-018383    3/1994
(Continued)

OTHER PUBLICATIONS

Extended European Search Report dated Apr. 26, 2010 and issued in corresponding European Patent Application No. EP 06 71 2976.
PCT International Search Report mailed on Mar. 28, 2006 for the corresponding International patent application No. PCT/JP2006/301833.
Office Action dated Jul. 14, 2010 issued in corresponding JP patent application No. 2005-043758.

*Primary Examiner* — Patricia Nordmeyer
(74) *Attorney, Agent, or Firm* — Posz Law Group, PLC

(57) ABSTRACT

A laminate is produced in which a long release sheet 2A, an adhesive layer 3A and a base material 4A are laminated together, and the base material 4A and the adhesive layer 3A are cut (half cut) so as not to penetrate through the release sheet 2A, so as to divide the base material 4A and the adhesive layer 3A into cover sheet portions 51A, bolstering portions 52A and a remainder portion 53A. The remainder portion 53A is then peeled off and removed, and an outer end portion of each of the bolstering portions 52A is half cut so as not to penetrate through the release sheet 2A, raised portions 6A being formed through the half cutting. The laminate sheet can be produced at low cost, and defects can be prevented from being formed on the adhesive sheet when the laminate sheet is wound into a roll.

11 Claims, 8 Drawing Sheets

FOREIGN PATENT DOCUMENTS

| JP | A-08-316175 | 11/1996 |
| JP | A-10-292159 | 4/1998 |
| JP | A-2004-035836 | 2/2004 |
| JP | A-2004-98649 | 4/2004 |

* cited by examiner (a)

(b)

(c)

LAMINATE SHEET AND LAMINATE SHEET ROLL

TECHNICAL FIELD

The present invention relates to a laminate sheet in which an adhesive sheet having a predetermined shape is laminated on a release sheet, and a laminate sheet in which a long release sheet, an adhesive layer and a base material are laminated together, and in particular relates to a laminate sheet according to which there is a reduction in defects that may be formed on the adhesive sheet, and a laminate sheet according to which the smoothness of the surface of the adhesive layer can be maintained, when the laminate sheets are wound into a roll.

BACKGROUND ART

A conventional laminate sheet in which adhesive labels are laminated on a release sheet is shown in FIG. 13 (Japanese Utility Model Publication No. 6-18383, Japanese Patent Application Laid-open No. 8-316175). In recent years, it has become that such a laminate sheet 1P is used in the manufacture of an optical disk for laminating a cover sheet on a light-receiving surface of the optical disk. As shown in FIG. 13, the conventional laminate sheet 1P is constituted from a long release sheet 2P, and cover sheet portions 51P (adhesive sheets) provided in succession in the longitudinal direction of the release sheet 2P. Each of the cover sheet portions 51P comprises a pressure-sensitive adhesive layer 3P and an optically transparent base material 4P, and has the same shape as an optical disk.

The laminate sheet 1P is wound into a roll, and transported and stored in the form of the roll, and then is rolled out when used. In the case of winding the laminate sheet 1P into a roll in this way, a cover sheet portion 51P may have other cover sheet portions 51P rolled thereupon, whereupon the cover sheet portion 51P may be marked with the outlines (arc-shaped marks) of the other cover sheet portions 51P as shown in FIG. 14 due to the roll pressure.

To prevent the cover sheet portions 51P from being marked with arc-shaped marks as described above, one can envisage winding the laminate sheet 1P with a reduced roll pressure, but there is a problem that such a roll wound up with a reduced roll pressure is prone to collapsing.

Moreover, when winding the laminate sheet 1P, pieces of foreign matter such as minute pieces of dust (diameter generally 5 to 50 μm) may be trapped between sections of the laminate sheet 1P rolled up on one another. In the case that the laminate sheet 1P is wound up in this state with foreign matter trapped therein, depressions are formed in the cover sheet portions 51P due to the foreign matter.

In the case that such arc-shaped marks or depressions are formed on the cover sheet portions 51P, this has not been a great problem with conventional optical disks, but with a high-capacity/high-recording-density next-generation optical disk (Blu-ray Disc), such arc-shaped marks or depressions become defects, and errors in reading/writing data may arise due to these defects.

On the other hand, with a laminate sheet in which a long release sheet, an adhesive layer and a base material are laminated together, the laminate sheet may be wound into a roll, and transported and stored in the form of the roll, and then rolled out and punched into a desired shape to be used.

However, in the case that the laminate sheet is wound into such a roll, the laminate sheet is subjected to roll pressure, and hence the adhesive layer which is softer than other layers deforms over time due to the roll pressure, so that the smoothness of the surface of the adhesive layer is lost, and primarily due to this a so-called orange peel state results, whereby there is a problem of minute thickness irregularities arising in the adhesive layer. In the case that an adhesive sheet punched out from the laminate sheet is used, for example, as a cover sheet for the optical disk, then errors in reading/writing data to/from the obtained optical disk may arise due to the thickness irregularities in the adhesive layer.

Moreover, in the case that an adhesive layer that has undergone orange peeling is used, for example, for bonding an anti-reflection film for a display of a PDA (Personal Digital Assistant) or the like, there may be a problem of the transparency of the display being impaired, or the image sharpness decreasing.

To resolve the above problems, there have been proposed a laminate sheet in which a protective material thicker than the adhesive sheet is provided (Japanese Patent Application Laid-open No. 2004-35836), and a laminate sheet in which a protective material is provided on a base material at portions other than a main used portion of an adhesive layer (Japanese Patent Application Laid-open No. 2004-51914). According to each of these laminate sheets, when the laminate sheet is wound into a roll, the protective material acts as a spacer, and hence defects can be prevented from being formed on the adhesive sheet, and the smoothness of the surface of the adhesive layer can be maintained.

DISCLOSURE OF THE INVENTION

Problem to be Solved by the Invention

However, with the above laminate sheets, an additional protective sheet, coating or the like is required for forming the protective material, and hence there is a problem that a material cost is incurred, and moreover the process for forming the protective material is complex and hence the manufacturing cost increases.

The present invention has been devised in view of the above state of affairs; it is an object of the present invention to provide a laminate sheet that can be produced at low cost and according to which defects can be prevented from being formed on an adhesive sheet when the laminate sheet is wound into a roll, a roll of the laminate sheet, and methods of producing the laminate sheet and the roll, and moreover a laminate sheet that can be produced at low cost and according to which the smoothness of an surface of the adhesive layer can be maintained, a roll of the laminate sheet, and methods of producing the laminate sheet and the roll.

Means for Solving the Problem

To attain the above object, firstly, the present invention provides a laminate sheet comprising a long release sheet; an adhesive sheet that is laminated on the release sheet and has a predetermined shape; and an auxiliary sheet that is provided on the release sheet in a different position to the adhesive sheet; wherein a raised portion is formed by half cutting on the front surface side of the auxiliary sheet or a part of the rear surface side of the release sheet corresponding to the auxiliary sheet, so that the thickness of a portion of the auxiliary sheet including the raised portion is greater than the thickness of a portion of the adhesive sheet (invention 1). Note that the auxiliary sheet provided on the release sheet may be provided on the same side as the adhesive sheet or may be provided on the opposite side.

Here, "base material" in the description of the present invention may be a sheet formed from a desired material or may be a release sheet. Also, "the rear surface of the release sheet" in the description of the present invention refers to the surface in which the adhesive sheet or the adhesive layer is not laminated (generally, the surface not processed for release).

Note that "half cut", in the case in which the object of processing is a laminate that is formed from a base material, an adhesive layer and a release material, generally refers to processing in which only the base material and the adhesive layer that is actually used part is cut, and the release material is not cut, and normally in order to make certain that the base material and the adhesive layer are cut, a blade is inserted to the mid-depth of the release material. However, "half cut" in the description of the present invention is not limited in this manner, the release material is not cut off, and to the extent that the object of the present invention is achieved, the blade does not have to reach the release material, and may be inserted to the mid-depth of the base material and the adhesive layer.

The laminate sheet according to the above invention (invention 1) does not require protective material, thus can be produced easily and at low cost. When such laminate sheet is wound into a roll, the raised portions act as spacers and a gap is formed between the front surface of the adhesive sheet and the rear surface of the release sheet rolled thereupon. Thus the outline portion of another adhesive sheet is prevented from being strongly pressed against an adhesive sheet and accordingly the formation of impressions in the adhesive sheet due to the roll pressure is suppressed. Moreover, even in the case that pieces of foreign matter such as minute pieces of dust are trapped between sections of the laminate sheet rolled up on one another when the laminate sheet is wound, because a gap is present between the front surface the adhesive sheets and the rear surface of the release sheet, then formation of depressions in the cover sheet portions due to the foreign matter can be prevented. In this manner, with the above invention (invention 1), defects that may be formed on the adhesive sheet when the laminate sheet is wound into a roll can be greatly reduced.

In the above invention (invention 1), the auxiliary sheet preferably has an identical layer structure to the adhesive sheet (invention 2). A laminate sheet having such a structure can be easily produced by half cutting a laminate formed from a plurality of layers having an identical shape.

In the above inventions (inventions 1 and 2) a plurality of the adhesive sheets are preferably provided in succession on the center portion in the width direction of the release sheet, and the auxiliary sheet is preferably provided on both side portions in the width direction of the release sheet (invention 3). By forming the laminate sheet with such a structure, defects that may be formed on the adhesive sheet when the laminate sheet is wound into a roll can be effectively reduced.

Secondly, the present invention provides a laminate sheet comprising: along release sheet; an adhesive layer that is laminated on the release sheet; and a base material that is laminated on the adhesive layer; wherein a raised portion is formed by half cutting on a part corresponding to a portion other than a main used portion of the adhesive layer of the front surface side of the base material or the rear surface side of the release sheet (invention 4). Note that "the main used portion of the adhesive layer" in the description of the present invention is the portion in which the surface of the adhesive layer requires smoothness.

The laminate sheet according to the above invention (invention 4), does not require protective material, thus can be produced easily and at low cost. When such a laminate sheet is wound into a roll the raised portions act as spacers, and a gap is formed between the front surface of the base material, corresponding to the main used portion of the adhesive layer, and the rear surface of the release sheet rolled on top of the base material. Thus wound laminate sheet is prevented from being strongly pressed against the main used portion of the adhesive sheet. Accordingly the formation of an orange peel, due to the roll pressure, on the front surface of the adhesive sheet is suppressed on the main used portion of the adhesive layer, and the smoothness of the surface of the adhesive sheet can be maintained on the main used portion of the adhesive layer. Moreover, even in the case that pieces of foreign matter such as minute pieces of dust are trapped between sections of the laminate sheet rolled up on one another when the laminate sheet is wound, because a gap is present between the front surface the adhesive sheet and the rear surface of the release sheet, then formation of depressions in the base material and the release layer due to the foreign matter can be prevented.

In the above invention (invention 4), it is preferable that the center portion in the width direction of the adhesive layer is the main used portion of the adhesive layer and that the raised portion is formed on both end portions in the width direction of the base material or the release sheet (invention 5). By forming the laminate sheet with such a structure, the smoothness of the surface of the adhesive layer can be effectively maintained when the laminate sheet is wound into a roll.

In the above inventions (inventions 1 to 5) it is preferable that the raised portion is formed so that the planar shape thereof is angled relative to the longitudinal direction of the laminate sheet (invention 6). Due to such a structure collapse of the rolled state of the roll caused by the raised portion can be prevented.

Thirdly, the present invention provides a laminate sheet roll formed by rolling up the laminate sheet (in inventions 1 to 6) (invention 7).

Fourthly, the present invention provides a method of producing a laminate sheet, comprising: producing a laminate sheet having: a long release sheet; an adhesive sheet that is laminated on the release sheet and has a predetermined shape; and an auxiliary sheet that is provided on the release sheet in a different position to the adhesive sheet; and half cutting (the blade may be inserted from the front surface side of the auxiliary sheet or from the rear surface side of the release sheet) a part in which the auxiliary sheet is positioned or a part corresponding to the auxiliary sheet, at an arbitrary stage, to form a raised portion on the front surface side of the auxiliary sheet or the rear surface side of the release sheet so that the thickness of a portion of the auxiliary sheet that includes the raised portion is greater than the thickness of a portion of the adhesive sheet (invention 8).

Fifthly, the present invention provides a method of producing a laminate sheet, comprising: laminating a long release sheet, an adhesive layer, and a base material in this order, half cutting an obtained laminate, and peeling off and removing an unnecessary portion to form an adhesive sheet and an auxiliary sheet having a predetermined shape; and half cutting (the blade may be inserted from the front surface side of the base material or from the rear surface side of the release sheet) a part in which the auxiliary sheet is positioned or a part corresponding to the auxiliary sheet, at an arbitrary stage, to form a raised portion on the front surface side of the auxiliary sheet or the rear surface side of the release sheet (invention 9).

Sixthly, the present invention provides a method of producing a laminate sheet, comprising: laminating a long release sheet, an adhesive layer, and a base material in this order; and half cutting (the blade may be inserted from the front surface side of the base material or from the rear surface side of the release sheet) a part in which a portion other than a main used portion of the adhesive layer is positioned or a part corresponding to the portion other than a main used portion of the adhesive layer, at an arbitrary stage, to form a raised portion on the front surface side of the base material or on the rear surface side of the release sheet (invention 10).

According to an above invention (invention 8), the above laminate sheets (in inventions 1 to 3) can be produced, and in particular, according to an above invention (invention 9), the above laminate sheets (in inventions 1 to 3) can be efficiently produced. Moreover, according to an above invention (invention 10), the above laminate sheets (in inventions 4 and 5) can be produced.

Seventhly, the present invention provides a method of producing a laminate sheet roll, comprising producing a laminate sheet using the method of producing a laminate sheet (in inventions 8 to 10), and then winding the obtained laminate sheet (invention 11).

Advantageous Effect of the Invention

A laminate sheet of the present invention does not require protective material, thus can be produced easily and at low cost. According to the laminate sheet of the present invention, defects that may be formed on the adhesive sheet when the laminate sheet is wound into a roll can be reduced, or the smoothness of the surface of the adhesive layer can be maintained. Moreover, according to the method of producing a laminate sheet according to the present invention, a laminate sheet does not require protective material, thus can be produced easily and at low cost, according to which defects that may be formed on the adhesive sheet when the laminate sheet is wound into a roll can be reduced, and a laminate sheet can be produced for which the smoothness of the surface of the adhesive layer can be maintained.

Figure 1:
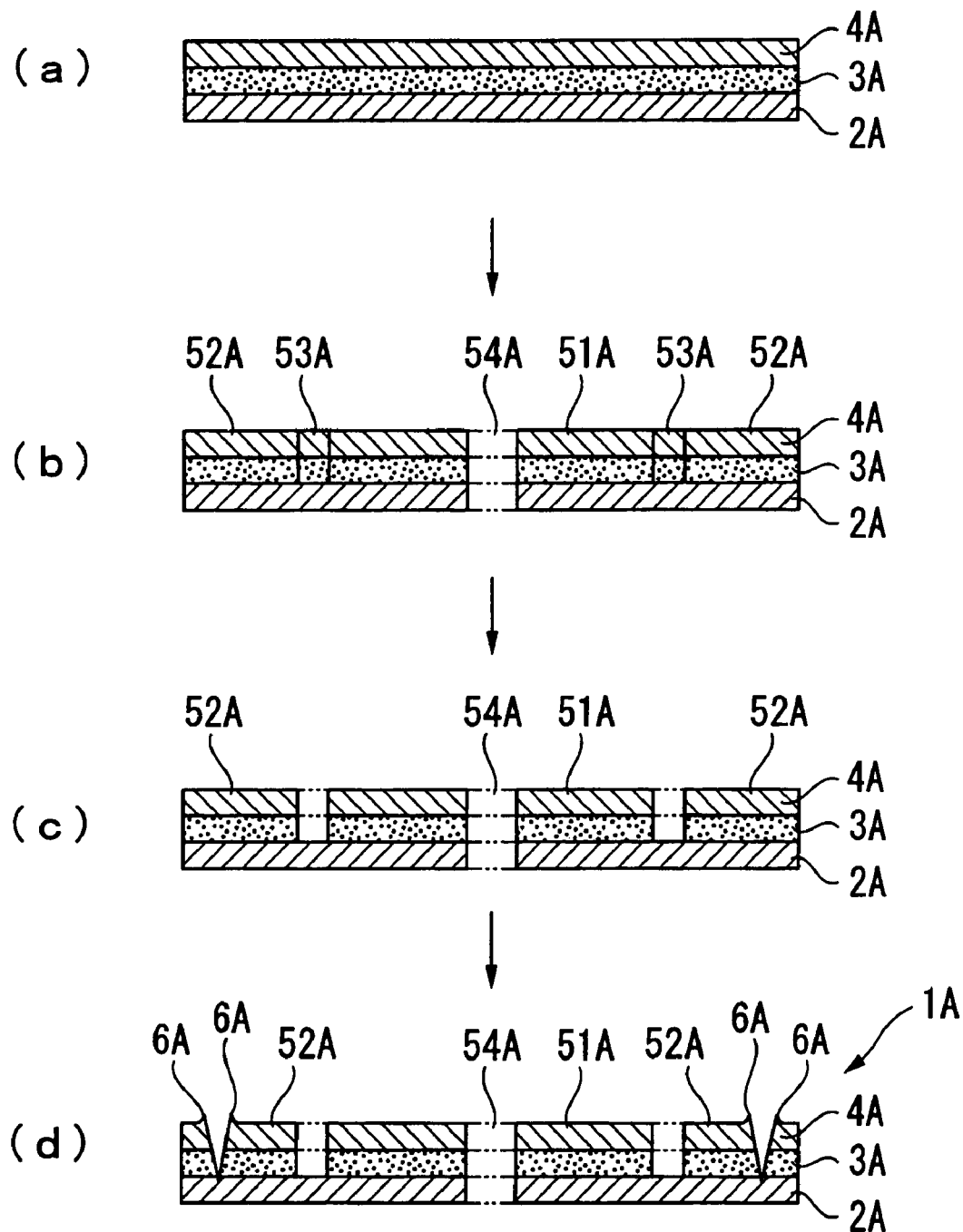
FIG. 1 consists of sectional views showing a laminate sheet producing method according to a first embodiment of the present invention.

EXPLANATION OF REFERENCE NUMERALS 1A, 1A', 11A, 12A, 13A, 1B, 1B', 1P: laminate sheet
2A, 2B: release sheet
3A, 3B: adhesive layer
4A, 4B: base material
51A, 51P: cover sheet portion (adhesive sheet having predetermined shape)
52A: bolstering portion (auxiliary sheet)
53A: remainder portion (unnecessary portion)
6A, 6A', 61A, 62A, 63A, 6B, 6B': raised portion

BEST MODE FOR CARRYING OUT THE INVENTION

Following is a description of embodiments of the present invention, with reference to the drawings.

First Embodiment

In a first embodiment, description is given taking as an example a laminate sheet used for bonding a cover sheet to a recording layer or for transferring a concavo-convex pattern of a stamper in an optical disk producing process; however, the present invention is not limited to this, but rather can be applied to any of various laminate sheets.

Figure 2:
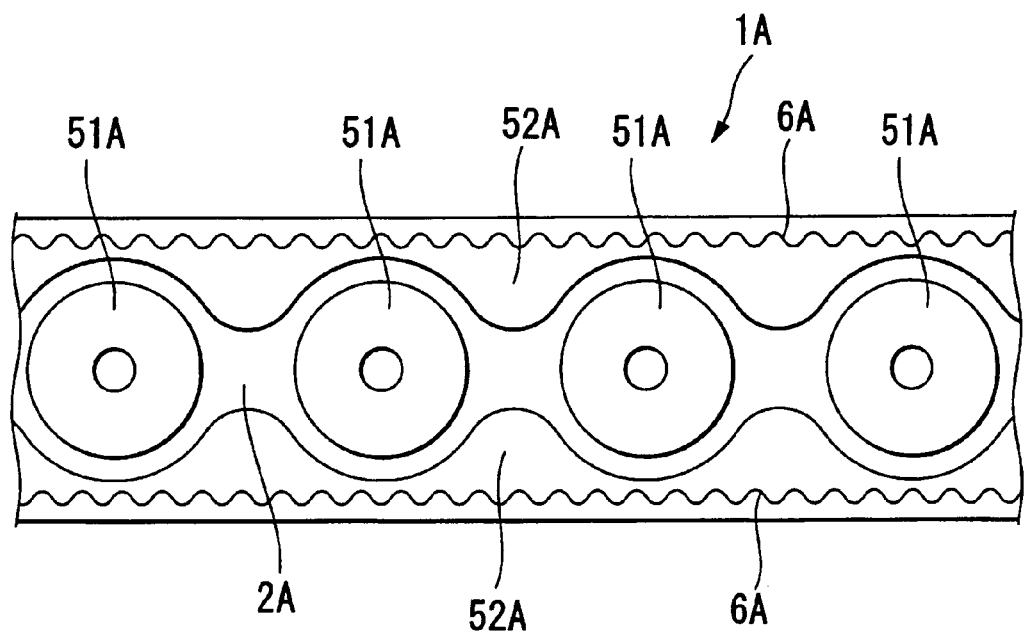
FIG. 2 is a plan view of a laminate sheet according to the same embodiment.
Figure 3:
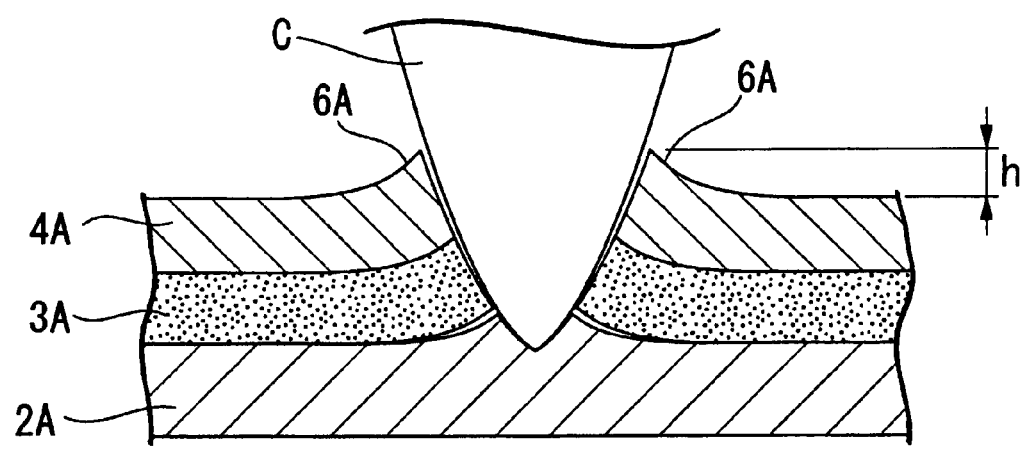
FIG. 3 is an enlarged view of a raised portion on the laminate sheet according to the same embodiment.
Figure 4:
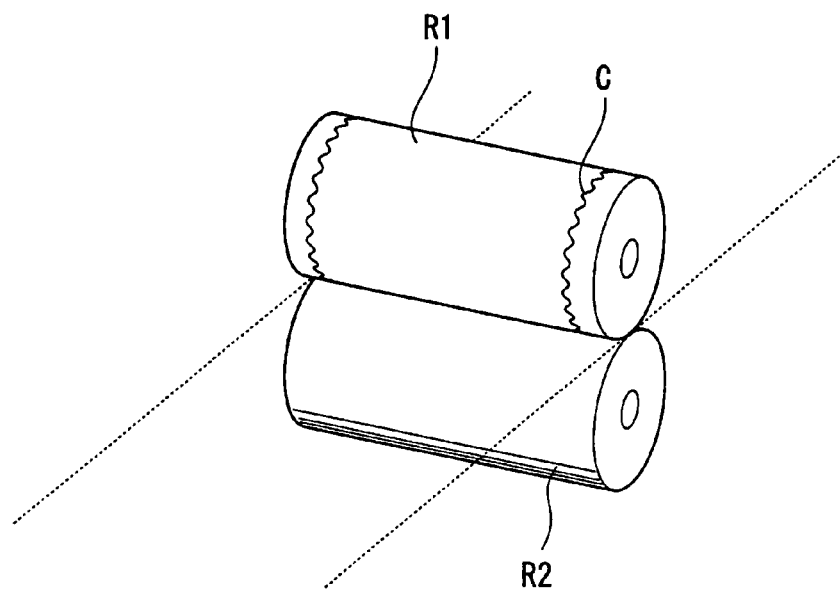
FIG. 4 is a perspective view of a die cut roller used in the production of the laminate sheet according to the same embodiment.
Figure 5:
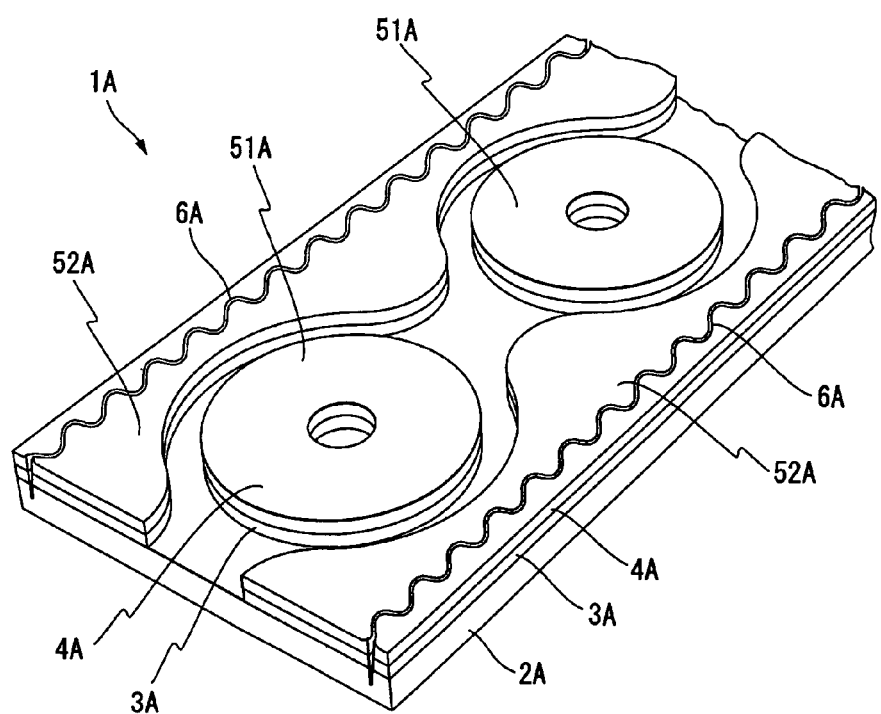
FIG. 5 is a perspective view of the laminate sheet according to the same embodiment.
Figure 6:
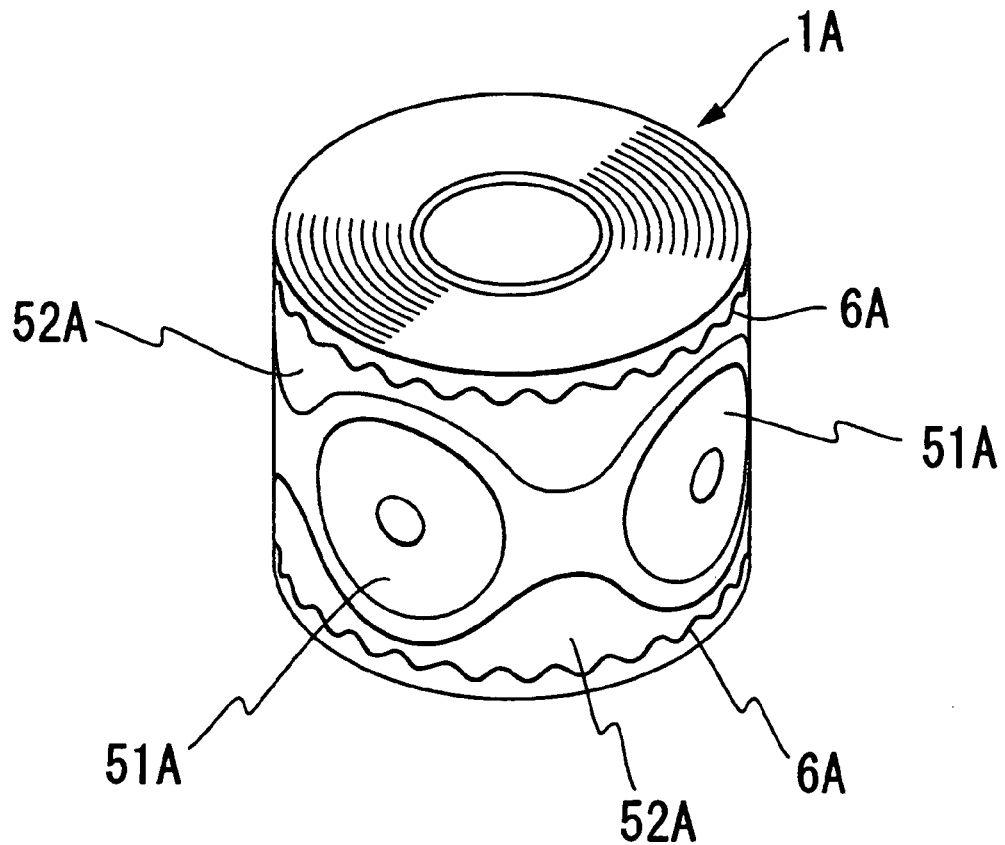
FIG. 6 is a perspective view of a roll of the laminate sheet according to the same embodiment.

FIGS. 1(*a*) to (*d*) are sectional views showing a laminate sheet producing method according to the first embodiment of the present invention, FIG. 2 is a plan view of a laminate sheet according to this embodiment, FIG. 3 is an enlarged view of a raised portion on the laminate sheet according to this embodiment, FIG. 4 is a perspective view of a die cut roller used in the production of the laminate sheet according to this embodiment, FIG. 5 is a perspective view of the laminate sheet according to this embodiment, and FIG. 6 is a perspective view of a roll of the laminate sheet according to this embodiment.

To produce the laminate sheet 1A according to the present embodiment, firstly, as shown in FIG. 1(*a*), a laminate in which a long release sheet 2A, an adhesive layer 3A and a base material 4A are laminated together is produced.

As the release sheet 2A, a conventional publicly known one can be used, for example a resin film such as a polyethylene terephthalate film or a polypropylene film or paper such as glassine, clay-coated paper or laminated paper (generally polyethylene-laminated paper) that has been subjected to release treatment with a silicone release agent or the like can be used. The thickness of the release sheet 2A is generally approximately from 10 to 200 µm, preferably approximately from 20 to 100 µm. The surface roughness (Ra) of the release treatment-subjected surface of the release sheet 2A is set in accordance with the smoothness to be conferred to the adhesive layer 3A, and for example in the case that the laminate sheet is to be used as a cover sheet of an optical disk, is generally not more than 0.5 µm, preferably not more than 0.1 µm.

As an adhesive constituting the adhesive layer 3A, a pressure-sensitive adhesive (tackiness agent) is generally used, although there is no limitation thereto, it also being possible to use, for example, an energy ray-curable adhesive. The type of the pressure-sensitive adhesive may be any of an acrylic type, a polyester type, a urethane type, a rubber type, a silicone type, or the like, or may be a so-called curable pressure sensitive adhesive.

To form the adhesive layer 3A, for example, a coating agent containing the adhesive constituting the adhesive layer 3A, and, if desired, also a solvent is prepared, and is then applied onto the release treatment-subjected surface of the release sheet 2A using a coater such as a kiss roll coater, a reverse roll coater, a knife coater, a roll knife coater or a die coater, and dried. The base material 4A is then press-bonded to the adhesive layer 3A formed in this way. The thickness of the adhesive layer 3A is generally approximately from 5 to 100 µm, preferably approximately from 10 to 30 µm.

An example of the base material 4A in the present embodiment is one for constituting a light-receiving surface of an optical disk, being a cover sheet for a recording layer of the optical disk. As the material of such a base material 4A, one having sufficient optical transparency in a wavelength region of light for reading data is preferable; so that the optical disk can be produced easily, one having a suitable rigidity/flexibility is preferable, and for storing the optical disk, one that is temperature-stable is preferable. As such a material, for example, a resin such as a polycarbonate, polymethyl methacrylate, or polystyrene can be used.

The linear expansion coefficient of the base material 4A is preferably approximately the same as the linear expansion coefficient of an optical disk substrate so that the optical disk will not warp at high temperature. For example, in the case that the optical disk substrate is made of a polycarbonate resin, the base material 4A is preferably made of the same polycarbonate resin.

The thickness of the base material 4A is set in accordance with the type of the optical disk and the thickness of other constituent parts of the optical disk, but is generally approximately from 25 to 200 µm, preferably approximately from 50 to 100 µm.

Note that the base material 4A may also have a multi-layer structure, for example a hard coat layer may be formed on a polycarbonate film.

Moreover, as the base material 4A in the present embodiment, a release sheet like the release sheet 2A described above can also be used. In this case, the release treatment-subjected surface of the base material 4A is superposed onto the adhesive layer 3A that has been laminated onto the release sheet 2A. According to such a laminate sheet, it is possible to peel the release sheet 2A off from the adhesive layer 3A, superpose the exposed adhesive layer 3A onto a recording layer of an optical disk, and then peel the base material 4A off from the adhesive layer 3A, and superpose another substrate (e.g. a cover sheet substrate for protecting the recording layer of the optical disk) onto the adhesive layer 3A. Moreover, in the case that the adhesive layer 3A comprises a curable pressure sensitive adhesive, an concavo-convex pattern of guide grooves, pits or the like may be provided on the exposed adhesive layer 3A using a stamper.

After the release sheet 2A, the adhesive layer 3A and the base material 4A have been laminated together as shown in FIG. 1(a), the base material 4A and the adhesive layer 3A are cut (half cut) so as not to penetrate through the release sheet 2A as shown in FIG. 1(b), thus dividing the base material 4A and the adhesive layer 3A into cover sheet portions 51A (adhesive sheets), bolstering portions 52A (corresponding to auxiliary sheets in the present invention), and a remainder portion 53A, and moreover a central portion of each of the cover sheet portions 51A is punched out so as to form a center hole portion 54A. The above half cutting and punching may be carried out using an ordinary method, and for example can be carried out using a punching apparatus or the like.

As shown in FIG. 2, the shape in plan view of each of the cover sheet portions 51A is a disk shape, this being the same as the shape of an optical disk. As shown in FIG. 2, the shape in plan view of each of the bolstering portions 52A is wavy overall, dipping in toward a side end portion of the laminate so as to run along an outer periphery of each cover sheet portion 51A, and protruding out between cover sheet portions 51A so as to enter in between the cover sheet portions 51A.

Next, the remainder portion 53A is peeled off and removed as shown in FIG. 1(c), and then as shown in FIG. 1(d) and FIG. 3, an outer end portion of each bolstering portion 52A is half cut such as to not penetrate through the release sheet 2A, raised portions 6A being formed through this half cutting.

As shown in FIG. 3, when a cutting blade C is inserted into each bolstering portion 52A, whereupon deformation takes place such that a portion pushed aside by the cutting blade C rises up on the surface side of the base material 4A on each side of the cutting blade C, whereby the raised portions 6A are formed.

The height h of the raised portions 6A (the height from the surface of the flat portion of the base material 4A to the top of a raised portion 6A) is preferably from 5 to 100 µm, particularly preferably from 10 to 50 µm. If the height h of the raised portions 6A is less than 5 µm, then the effects of the present invention cannot be sufficiently obtained, whereas if the height h of the raised portions 6A exceeds 100 µm, then the diameter (volume) of the roll obtained when the laminate sheet 1A is wound may become too large.

In the present embodiment, as shown in FIG. 3, the cutting blade C penetrates through the base material 4A and the adhesive layer 3A, and also somewhat cuts the release sheet 2A, but so long as raised portions 6A of the desired height can be formed, there are no particular limitations on the depth of the half cut, for example the depth of the half cut may be to the bottom of the adhesive layer 3A or to the mid-depth of the adhesive layer 3A, or the depth of the half cut may be to the bottom of the base material 4A or to the mid-depth of the base material 4A. Note, however, that if the depth of the half cut is too deep, then the strength of the release sheet 2A may decrease, and hence the laminate sheet 1A may rupture; the thickness of a remainder portion not cut by the half cutting is thus preferably made to be not less than 10 µm, particularly preferably not less than 20 µm.

In the present embodiment, the shape in plan view of each raised portion 6A is wavy as shown in FIG. 2, but there is no limitation to this. Note, however, that if the shape in plan view of each raised portion 6A is made to be a straight line parallel to the longitudinal direction of the laminate sheet 1A, then when the laminate sheet 1A is wound into a roll, the raised portions 6A will lie on top of one another in one plane, and hence the roll will be prone to collapsing under external force; the raised portions 6A are thus preferably formed such that the shape in plan view thereof is angled relative to the longitudinal direction of the laminate sheet 1A.

The positions of formation of the raised portions 6A are preferably at the both side end portions of the laminate sheet 1A, whereby the effects of the raised portions 6A can be exhibited effectively. Specifically, the raised portions 6A are preferably formed such that the outermost edge of each raised portion 6A is within 20 mm of a side edge face of the laminate sheet 1A.

As the cutting blades C, there can be used for example ones provided on an outer peripheral portion of a die cut roller R1 as shown in FIG. 4. In this case, the laminate is passed between the die cut roller R1 and an anvil roller R2 provided facing the die cut roller R1, whereby the half cutting can be carried out efficiently so as to form the raised portions 6A. Note that, as well as the cutting blades C, the die cut roller R1 may also have a cutting blade for half cutting for dividing the base material 4A and the adhesive layer 3A into the cover sheet portions 51A, the bolstering portions 52A and the remainder portion 53A, and/or a punching blade for forming the center hole portions 54A.

There are no particular limitations on the shape of the blade edge of each cutting blade C so long as raised portions 6A of a desired height can be formed, but in general higher raised portions 6A can be formed with a blunt one than a sharp one. For example, a cutting blade C having a blade edge angle of from 60 to 100° can be preferably used.

As shown in FIG. 5, the laminate sheet 1A produced as described above comprises a long release sheet 2A, a plurality of disk-shaped cover sheet portions 51A comprising the adhesive layer 3A and the base material 4A provided in succession along a width-direction central portion of a release treatment-subjected surface of the release sheet 2A, and the wavy bolstering portions 52A comprising the adhesive layer 3A and the base material 4A provided along the both width-direction side portions of the release treatment-subjected surface of the release sheet 2A, and the raised portions 6A which are wavy in plan view are formed on outer end portions of the bolstering portions 52A.

For the laminate sheet 1A, the thickness of the portions of the bolstering portions 52A where the raised portions 6A are present is greater than the thickness of the cover sheet portions 51A by the height of the raised portions 6A.

When the laminate sheet 1A is wound into a roll as shown in FIG. 6, the raised portions 6A formed on the bolstering portions 52A act as spacers, and hence a small gap arises between the surface of each of the cover sheet portions 51A and a rear surface of the release sheet 2A rolled thereupon. Each of the cover sheet portions 51A can thus be prevented from being strongly pressed by the outline portion of another cover sheet portion 51A, and hence it is suppressed that the cover sheet portions 51A is marked due to the roll pressure.

Moreover, even in the case that pieces of foreign matter such as minute pieces of dust are trapped between sections of the laminate sheet 1A rolled up on one another when the laminate sheet 1A is wound, because a gap is present between the surface of each of the cover sheet portions 51A and the rear surface of the release sheet 2A, if the diameter of the pieces of foreign matter is smaller than the size of this gap, then formation of depressions in the cover sheet portions 51A due to the foreign matter can be prevented. Furthermore, with a conventional roll, even in the case that just a single piece of foreign matter gets trapped in, depressions are formed due to the effect of this foreign matter in a plurality of the cover sheets which are rolled up on top of one another, whereas for the roll of the laminate sheet 1A according to the present embodiment, the release sheet 2A and each of the cover sheet portions 51A can be displaced from one another by the size of the gap therebetween in the radial direction of the roll, and hence even if a piece of foreign matter having a diameter greater than the size of the gap becomes attached to a cover sheet portion 51A, the effect of the piece of foreign matter on other cover sheet portions 51A can be suppressed, and hence formation of depressions in a plurality of the cover sheet portions 51A due to the foreign matter can be prevented.

Note that the bolstering portions 52A are provided on the laminate sheet 1A according to the present embodiment, and due to such bolstering portions 52A having a thickness the same as the thickness of the cover sheet portions 51A being provided in this way, the rigidity of the laminate sheet 1A overall is secured, and hence there is an advantage that deformation of the roll is suppressed when the laminate sheet 1A is wound into a roll.

As described above, according to the laminate sheet 1A of the present embodiment, defects that may be formed on the cover sheet portions 51A when the laminate sheet 1A is wound into a roll can be greatly reduced.

Note that in the above embodiment, the division of the base material 4A and the adhesive layer 3A and the formation of the center hole portions 54A (FIG. 1(b)) and the peeling off and removal of the remainder portion 53A (FIG. 1(c)) were carried out before the formation of the raised portions 6A (FIG. 1(d)), but there is no limitation to this in the present invention, it being possible to carry out the formation of the raised portions 6A (FIG. 1(d)) before the peeling off and removal of the remainder portion 53A (FIG. 1(c)), or to form the raised portions 6A first (FIG. 1(d)), and then carry out the division of the base material 4A and the adhesive layer 3A and the formation of the center hole portions 54A (FIG. 1(b)) and the peeling off and removal of the remainder portion 53A (FIG. 1(c)).

Figure 7:
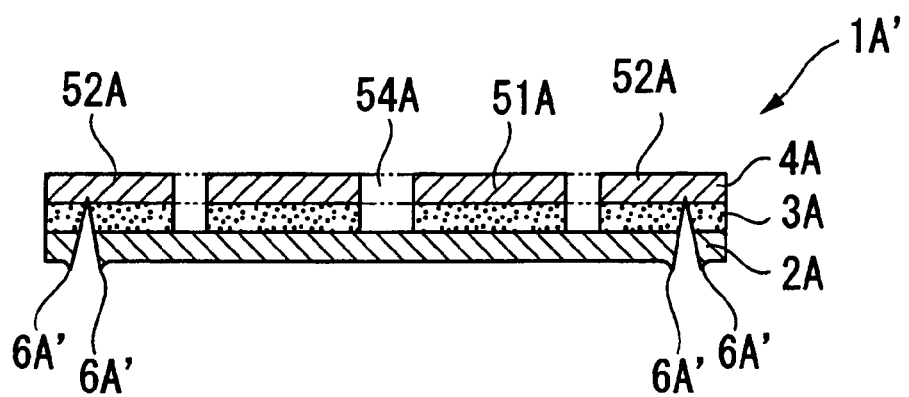
FIG. 7 is a sectional view of a laminate sheet according to another embodiment of the present invention.

Moreover, in the above embodiment, the half cutting of the bolstering portions 52A was carried out from the surface side of the base material 4A so as to form the raised portions 6A on the base material 4A surface side of the bolstering portions 52A, but there is no limitation to this in the present invention, it also being possible to carry out half cutting from a rear surface side of the both side end portions of the release sheet 2A so as to form raised portions 6A' on the rear surface side of the both side end portions of the release sheet 2A as in the laminate sheet 1A' shown in FIG. 7. When this laminate sheet 1A' is wound into a roll, the raised portions 6A' formed on the rear surface side of the release sheet 2A act as spacers, and hence a small gap arises between the surface of each of the cover sheet portions 51A and the rear surface of the release sheet 2A rolled thereupon, whereby effects as described above can be obtained.

Figure 8:
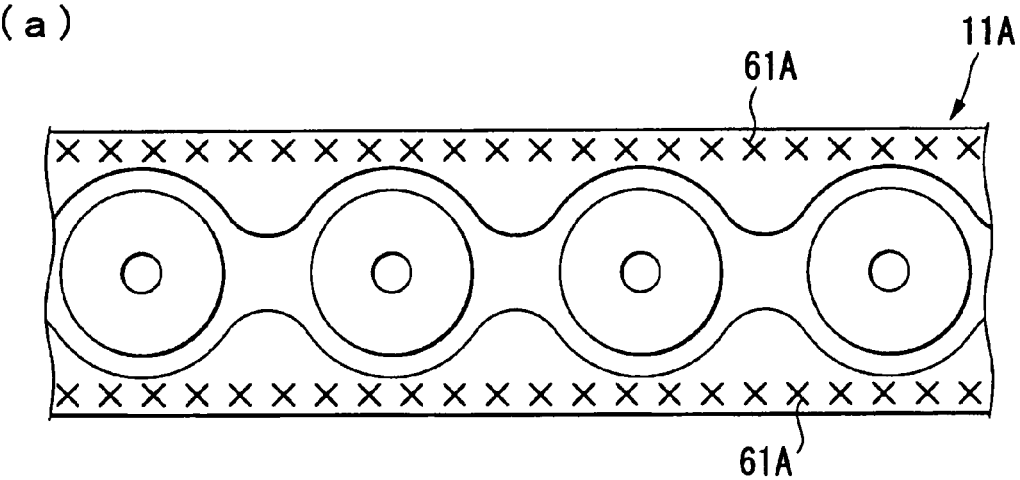
FIG. 8 consists of plan views of laminate sheets according to other embodiments of the present invention.
Figure 8:
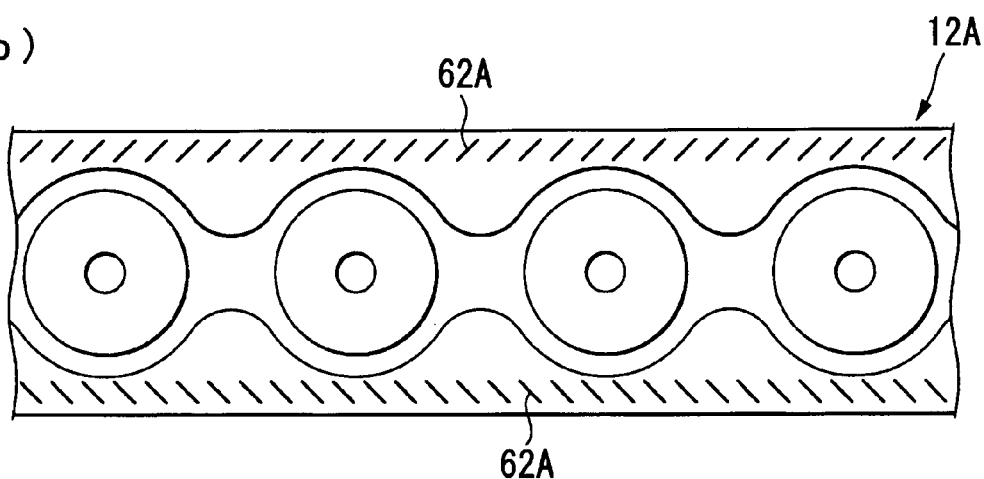
Figure 8:
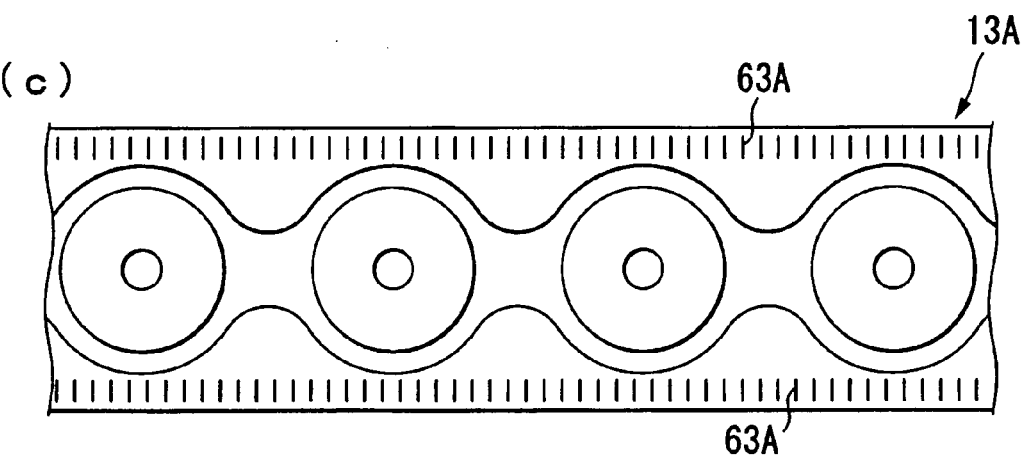

Furthermore, in the embodiment described above, the shape in plan view of each of the raised portions 6A was made to be wavy, but there is no limitation to this in the present invention, for example a plurality of x-shaped raised portions 61A provided in a line may be used as in the laminate sheet 11A shown in FIG. 8(a), a plurality of diagonal line-shaped raised portions 62A provided in a line may be used as in the laminate sheet 12A shown in FIG. 8(b), or a plurality of rod-shaped raised portions 63A provided in a line with each being perpendicular to the longitudinal direction of the laminate sheet 13A may be used as in the laminate sheet 13A shown in FIG. 8(c).

Second Embodiment

In a second embodiment, description is given taking as an example a laminate sheet for which the surface of the adhesive layer is required to be smooth, for example a laminate sheet in which the adhesive layer is used for bonding a cover sheet for protecting a recording layer of an optical disk or a film for a display of a PDA or the like.

Figure 9:
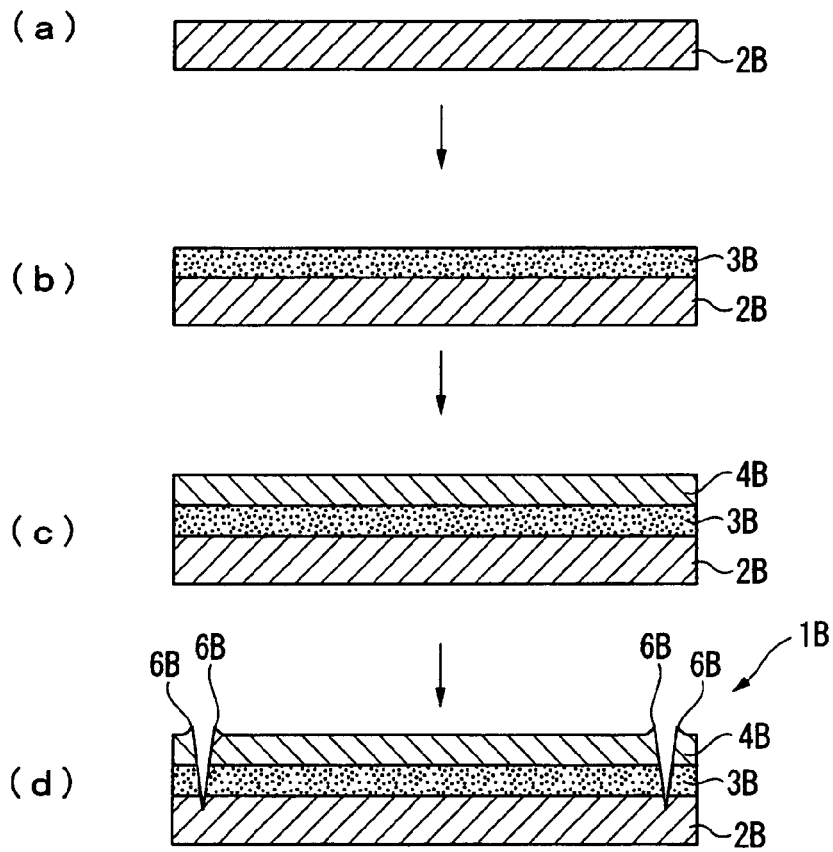
FIG. 9 consists of sectional views showing a laminate sheet producing method according to a second embodiment of the present invention.
Figure 10:
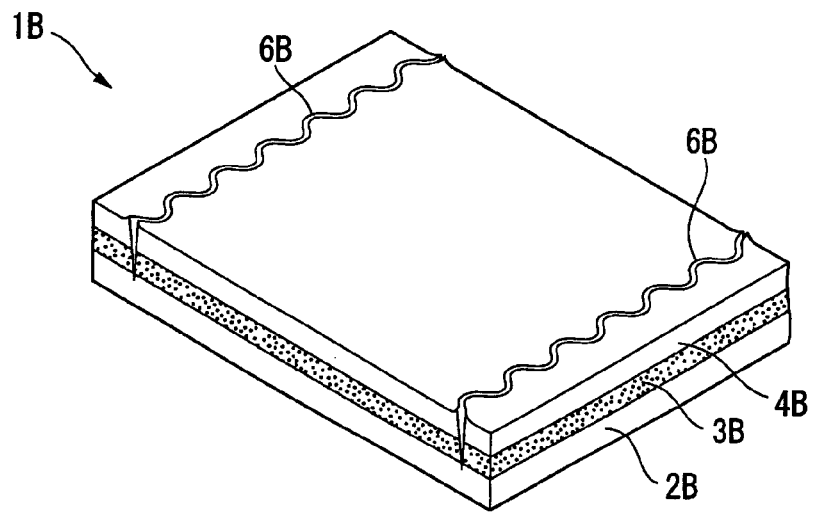
FIG. 10 is a perspective view of a laminate sheet according to the same embodiment.
Figure 11:
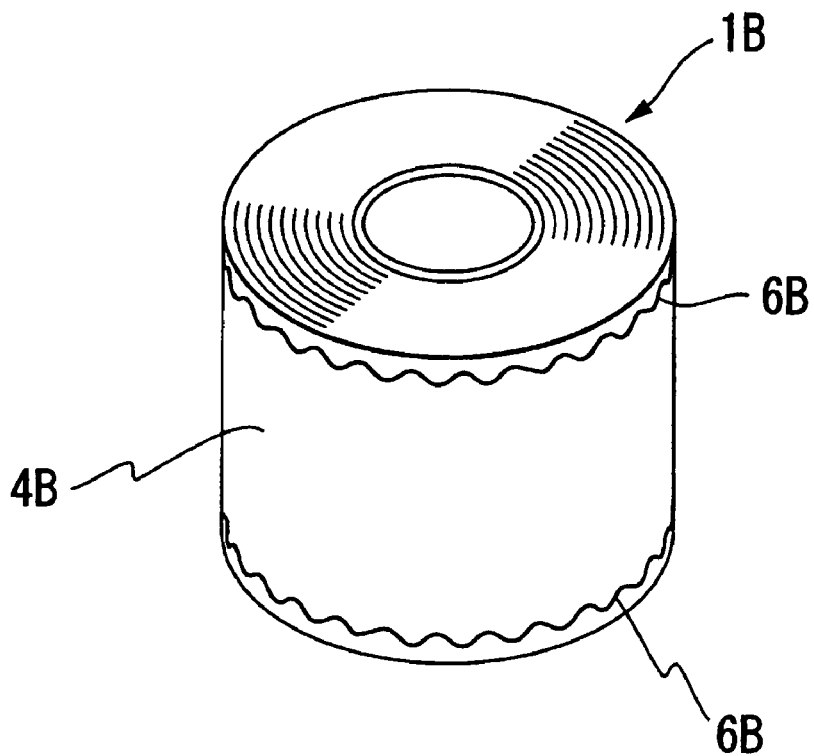
FIG. 11 is a perspective view of a roll of the laminate sheet according to the same embodiment.

FIGS. 9(a) to (d) are sectional views showing a laminate sheet producing method according to the second embodiment of the present invention, FIG. 10 is a perspective view of a laminate sheet according to this embodiment, and FIG. 11 is a perspective view of a roll of the laminate sheet according to this embodiment.

To produce the laminate sheet 1B according to the present embodiment, as shown in FIGS. 9(a) and (b), an adhesive layer 3B is formed on a release treatment-subjected surface of a long release sheet 2B, and then as shown in FIG. 9(c), a base material 4B is press-bonded to a surface of the adhesive layer 3B.

As the release sheet 2B, one like the release sheet 2A in the first embodiment described above can be used.

The adhesive layer 3B may be one used for bonding the base material 4B to a predetermined bonded object after peeling off from the release sheet 2B, or may be one used for bonding predetermined bonded objects together after separating away from the release sheet 2B and the base material 4B. In the present embodiment, a width-direction central portion of the adhesive layer 3B is a main used portion (the portion for which the surface of the adhesive layer is required to be smooth).

As an adhesive constituting the adhesive layer 3B, any of various types of adhesive can be selected in accordance with the usage of the adhesive layer 3B or the base material 4B. The adhesive may be a pressure-sensitive adhesive (tackiness agent), or may be a curable adhesive. The type of the pressure-sensitive adhesive may be any of an acrylic type, a polyester type, a urethane type, a rubber type, a silicone type, or the like, or may be a curable pressure sensitive adhesive. Examples of the type of a curable adhesive include radiation-curable adhesives such as an energy ray-curable adhesive or thermosetting adhesive.

The thickness of the adhesive layer 3B is generally approximately from 5 to 100 μm, preferably approximately from 10 to 30 μm. The formation of the adhesive layer 3B can be carried out using the same method as for the formation of the adhesive layer 3A in the first embodiment described above.

The base material 4B may be one to be bonded to a predetermined bonded object by the adhesive layer 3B, or may be a release sheet to be peeled off from the adhesive layer 3B. In the case of the former, the base material 4B is used together with the adhesive layer 3B as an adhesive sheet, the width-direction central portion thereof being the main used portion.

In the case that the base material 4B is used as an adhesive sheet, as the material of the base material 4B, any of various types of material can be selected in accordance with the usage of the base material 4B. For example, in the case that the base material 4B is to be used as a cover sheet for a recording layer of an optical disk, a resin such as a polycarbonate, polymethyl methacrylate or polystyrene can be selected as the material of the base material 4B. Moreover, for example, in the case that the base material 4B is to be used as a film for a display for a PDA or the like, a cellulose ester such as cellulose diacetate, cellulose triacetate or cellulose acetate butyrate, a polyester such as polyethylene terephthalate or polybutylene terephthalate, a polyolefin such as polyethylene or polypropylene, or a resin such as a polyamide, a polyimide, polyvinyl chloride, polymethyl methacrylate, a polycarbonate, or a polyurethane can be selected as the material of the base material 4B; a base material made of such a resin can be used after the surface thereof has been subjected to anti-reflection treatment, anti-glare treatment, or the like.

In the case that the base material 4B is used as an adhesive sheet, the thickness of the base material 4B is set in accordance with the usage of the base material 4B, but is generally approximately from 25 to 300 μm, preferably approximately from 50 to 200 μm.

On the other hand, in the case that the base material 4B is a release sheet, as the material of the base material 4B, a material like that for the release sheet 2B described above can be selected. Note, however, that in this case, it is preferable to make one of the release sheet 2B and that the base material 4B be a light release force type release sheet, and the other be a heavy release force type release sheet.

After the laminate in which the release sheet 2B, the adhesive layer 3B and the base material 4B are laminated together has been produced, as shown in FIG. 9(d), the both side end portion of the laminate is half cut such as to not penetrate through the release sheet 2B, raised portions 6B being formed through this half cutting.

The method of forming the raised portions 6B, the depth of the half cutting, and the height and shape in plan view of the raised portions 6B are as for the raised portions 6A in the first embodiment described above.

As shown in FIG. 10, the laminate sheet 1B produced as described above comprises the long release sheet 2B, the adhesive layer 3B which is laminated on a release treatment-subjected surface of the release sheet 2B and has a width-direction central portion as a main used portion thereof, and the base material 4B laminated on the adhesive layer 3B, and the raised portions 6B which are wavy in plan view are formed on both side end portion of the base material 4B.

When the laminate sheet 1B is wound into a roll as shown in FIG. 11, the raised portions 6B formed on the both side end portions of the base material 4B act as spacers, and hence a small gap arises between the surface of the width-direction central portion of the base material 4B and a rear surface of the release sheet 2B rolled thereupon. The main used portion of the adhesive layer 3B can thus be prevented from being strongly pressed by the section of the laminate sheet 1B rolled thereupon. For the main used portion of the adhesive layer 3B, the surface of the adhesive layer is thus prevented from orange-peeling due to the roll pressure, and hence the smoothness of the surface of the adhesive layer at the main used portion of the adhesive layer 3B can be maintained.

Moreover, even in the case that pieces of foreign matter such as minute pieces of dust are trapped between sections of the laminate sheet 1B rolled up on one another when the laminate sheet 1B is wound, because a gap is present between the surface of the base material 4B and the rear surface of the release sheet 2B, if the diameter of the pieces of foreign matter is smaller than the size of this gap, then formation of depressions in the base material 4B and the adhesive layer 3B due to the foreign matter can be prevented. Furthermore, with a conventional roll, even in the case that just a single piece of foreign matter gets trapped in, depressions are formed due to the effect of this foreign matter in a plurality of layers of the base material 4B and the adhesive layer 3B which are rolled up on top of one another, whereas for the roll of the laminate sheet 1B according to the present embodiment, the release sheet 2B, the adhesive layer 3B and the base material 4B can be displaced from one another by the size of the gap therebetween in the radial direction of the roll, and hence even if a piece of foreign matter having a diameter greater than the size of the gap becomes attached to the base material 4B, the effect of the piece of foreign matter on other layers of the base material 4B and the adhesive layer 3B rolled thereupon can be suppressed, and hence formation of depressions in a plurality of places on the base material 4B and the adhesive layer 3B due to the foreign matter can be prevented.

To use the laminate sheet 1B that has been made into a roll as described above, the laminate sheet 1B is rolled out from the roll, and the base material 4B and the main used portion of the adhesive layer 3B is cut to a desired shape, and peeled off from the release sheet 2B. The cutting can be carried out using an ordinary method, for example can be carried out using a punching apparatus or the like.

The smoothness of the surface of the adhesive layer of the cut adhesive layer 3B is maintained, and hence in the case, for example, of using the adhesive layer 3B for bonding a cover sheet for protecting a recording layer of an optical disk, errors in reading/writing data due to the adhesive layer 3B can be prevented from arising; moreover, in the case of using the adhesive layer 3B for bonding an anti-reflection film for a display, the adhesive layer 3B does not impair the transparency of the display or the image sharpness.

Figure 12:
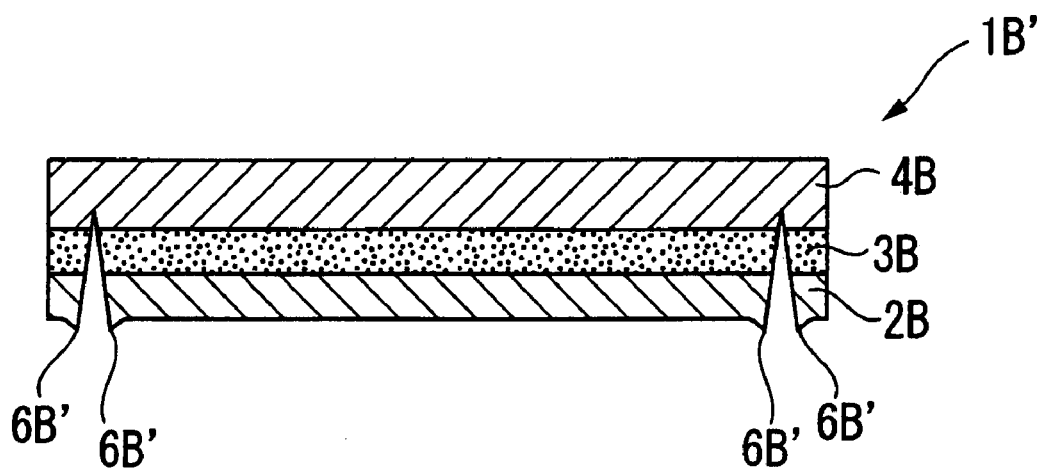
FIG. 12 is a sectional view of a laminate sheet according to another embodiment of the present invention.
Figure 13:
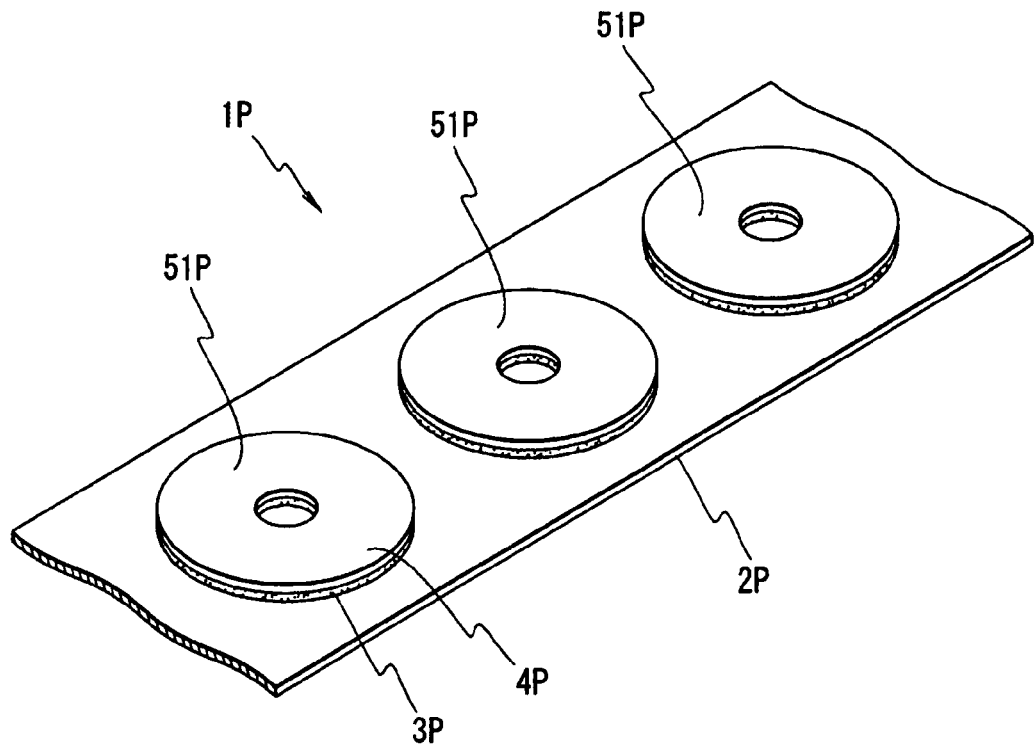
FIG. 13 is a perspective view of a conventional laminate sheet.
Figure 14:
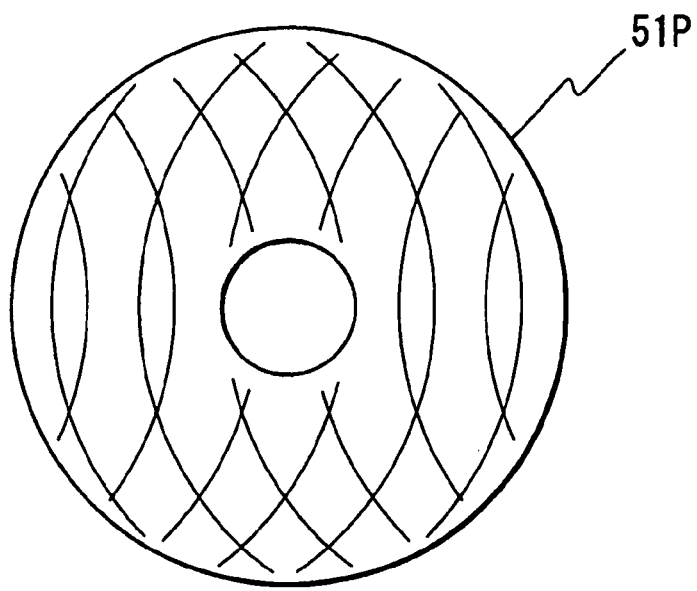
FIG. 14 is a plan view of a cover sheet portion on the conventional laminate sheet.

Note that in the above embodiment, the half cutting was carried out from the base material 4B surface side so as to form the raised portions 6B on the base material 4B surface side, but there is no limitation to this in the present invention, it also being possible to carry out half cutting from a rear surface side of the both side end portions of the release sheet 2B so as to form raised portions 6B' on the rear surface side of the both side end portions of the release sheet 2B as in the laminate sheet 1B' shown in FIG. 12. When this laminate sheet 1B' is wound into a roll, the raised portions 6B' formed on the rear surface side of the release sheet 2B act as spacers, and hence a small gap arises between the surface of the width-direction central portion of the base material 4B and the rear surface of the release sheet 2B rolled thereupon, whereby effects as described above can be obtained.

Moreover, in the above embodiment, the shape in plan view of each of the raised portions 6B was made to be wavy, but there is no limitation to this in the present invention, for example x-shaped, diagonal line-shaped, or rod-shaped raised portions may be used as shown in FIGS. 8(a) to (c).

Other Embodiments

The above embodiments have been described to aid understanding of the present invention, not to limit the present invention. The various elements disclosed in the above embodiments are thus deemed to also include all design variations and equivalents falling within the technical scope of the present invention.

For example, each of the bolstering portions 52A on the laminate sheet 1A may have a band shape with constant width.

Note that in the present invention, the raised portions 6A or 6B were formed by half cutting, but as a method of deforming the both end portions of the laminate sheet, one can also envisage a method in which the both end portions of the laminate sheet are passed between two facing cogwheels so as to form undulations, or a method in which holes are formed in both end portions of the laminate sheet using a laser, a hot needle or the like, a raised portion being formed around the rim of each hole. However, for a roll of a laminate sheet produced using the former method, there is no acting as a spacer at portions where a concave portion overlaps with a convex portion and hence problems may arise due to the roll pressure, and with the latter method, there is a problem that the manufacturing cost for the laminate sheet becomes very high.

EXAMPLES

Following is a more detailed description of the present invention through examples and so on; however, the scope of the present invention is not limited by these examples and so on.

Example 1

1 part by weight of a polyisocyanate compound (made by Takeda Pharmaceutical Company Ltd., Takenate D-140N) as a crosslinking agent was added to 100 parts by weight of a copolymer obtained by copolymerizing 97 parts by weight of n-butyl acrylate and 3 parts by weight of 2-hydroxyethyl acrylate, and 200 parts by weight of toluene as a solvent was further added, thus a pressure-sensitive adhesive coating agent was obtained.

The above pressure-sensitive adhesive coating agent was applied using a knife coater such that the thickness after drying would be 25 µm onto the release treatment-subjected surface of a release sheet (made by LINTEC CORPORATION, SP-PET3811, thickness: 38 µm, surface roughness (Ra) of release treatment-subjected surface: 0.02 µm) obtained by applying a silicone release agent onto one surface of a polyethylene terephthalate film, and drying was carried out for 3 minutes at 100° C. A base material made of a polycarbonate film (made by Teijin Ltd., Pure-Ace C110-75, thickness: 75 µm) was press-bonded to the pressure-sensitive adhesive layer thus formed, thus producing a long laminate having a width of 150 mm and a length of 100 m.

Next, the laminate was passed between a die cut roller having a wavy cutting blade (blade edge angle: 60 to 90°) provided around an outer periphery thereof and an anvil roller provided facing the die cut roller, thus half cutting each of the width-direction end portions (a position 10 to 20 mm from each side edge face) of the base material and the pressure-sensitive adhesive layer in a wavy shape in plan view as shown in FIG. 2 so as not to penetrate through the release sheet (thickness of remainder portion not cut: 20 µm), raised portions being formed by the half cutting. The height of the raised portions was approximately from 15 to 20 µm.

Next, using a punching apparatus (made by Mark Andy Inc., Mark Andy 910), as shown in FIG. 2, a width-direction central portion of the base material and the pressure-sensitive adhesive layer was divided into disk-shaped cover sheet portions (diameter: 120 mm) and a remainder portion, and moreover a central portion of each cover sheet portion was punched out so as to form a center hole portion, and then the remainder portion was peeled off and removed as shown in FIG. 5.

The laminate sheet thus produced was rolled onto a 3 inch-diameter ABS core with an initial rolling tension of 12 N and a taper ratio of 50%, thus a roll was obtained (see FIG. 6).

Comparative Example 1

A laminate sheet was produced as in Example 1 except that the formation of raised portions on the laminate using the die cut roller was not carried out, and then the laminate sheet obtained was rolled onto a core under the same rolling conditions as in Example 1, thus obtaining a roll.

Test Examples

The rolled laminate sheet in each of Example 1 and Comparative Example 1 was left for 1 week under a 23° C. 50% relative humidity atmosphere, and then the state of the cover sheet portions was observed using a mercury lamp projection method. In the mercury lamp projection method, the adhesive sheet (cover sheet portion) from which the release sheet had been peeled off was placed between a mercury lamp (made by Ushio Inc., light source: SX-01250HQ, mercury lamp power source: B-H250) and a white projection screen, and the projection of the adhesive sheet on the projection screen was observed visually. The distance between the mercury lamp and the adhesive sheet was made to be 170 cm, and the distance between the adhesive sheet and the projection screen was made to be 30 cm.

The result was that for the cover sheet portion of the laminate sheet of Example 1, defects were not seen at all, whereas for the cover sheet portion of the laminate sheet of Comparative Example 1, marks of the outline of other cover sheet portions or the bolstering portions and depressions caused by foreign matter were seen.

INDUSTRIAL APPLICABILITY

The present invention is useful for an adhesive sheet desired to have no defects, for example an adhesive sheet for manufacturing an optical disk (a cover sheet for protecting a recording layer, a sheet having a stamper-receiving layer having guide grooves, pits or the like formed thereon, etc.), or an adhesive sheet that is required to have a smooth surface of the adhesive layer, for example an adhesive sheet for bonding a film for a display of a PDA or the like.

The invention claimed is:

1. A laminate sheet comprising:
a long release sheet;
an adhesive sheet laminated on said release sheet and having a predetermined shape;
an auxiliary sheet laminated on said release sheet, and disposed laterally to said adhesive sheet; and
a crevice in said auxiliary sheet, or a part of the rear surface side of said release sheet corresponding to said auxiliary sheet, the sides of the crevice including a raised portion extending beyond the surface of the auxiliary sheet, or beyond the rear surface side of said release sheet that corresponds to said auxiliary sheet, extending longitudinally along the long release sheet in a non-linear pattern when viewed from above,
a thickness of a portion of said auxiliary sheet that includes said raised portion being greater than the thickness of a portion of said adhesive sheet.

2. A laminate sheet comprising:
a long release sheet;
an adhesive layer that is laminated on said release sheet;
a base material that is laminated on said adhesive layer; and
a crevice in the base material or in the release sheet, formed in a part of the front surface side of said base material, or the rear surface side of the release sheet, corresponding to a portion other than a main used portion of said adhesive layer, and lateral to the main used portion of said adhesive layer,
extending longitudinally along the long release sheet in a non-linear pattern when viewed from above,
the sides of the crevice including a raised portion extending beyond the surface of the base material or the release sheet, respectively.

3. A laminate sheet comprising:
a long release sheet;
an adhesive sheet laminated on said release sheet and having a predetermined shape, said adhesive sheet being provided in a central portion, in a width direction, of said release sheet; and
an auxiliary sheet laminated on said release sheet, and provided laterally to said adhesive sheet, on both side portions, in the width direction, of said release sheet; wherein
a raised portion formed in said auxiliary sheet or a part of the rear surface side of said release sheet corresponding to said auxiliary sheet, the raised portion comprising sides of a crevice in the auxiliary sheet raised beyond the surface of the auxiliary sheet or beyond the rear surface side of said release sheet that corresponds to said auxiliary sheet,
said crevice has an opening at a raising end of said raised portion, and
a thickness of a portion of said auxiliary sheet that includes said raised-portion is greater than the thickness of a portion of said adhesive sheet.

4. The laminate sheet according to claim 1, wherein
said auxiliary sheet has an identical layer structure to said adhesive sheet.

5. The laminate sheet according to claim 1, wherein
a plurality of said adhesive sheets are provided in succession on the center portion in the width direction of said release sheet, and said auxiliary sheet is provided on both side portions in the width direction of said release sheet.

6. The laminate sheet according to claim 1, wherein
said raised portion is formed so that the planar shape thereof is angled relative to the longitudinal direction of said laminate sheet.

7. A laminate sheet roll
obtained by rolling up the laminate sheet according to claim 1.

8. A laminate sheet comprising:
a long release sheet;
an adhesive layer that is laminated on said release sheet; and
a base material that is laminated on said adhesive layer; wherein
a raised portion is formed in a part of the front surface side of said base material, or the rear surface side of the release sheet, corresponding to a portion other than a main used portion of said adhesive layer, and lateral to the main used portion of said adhesive layer, the raised portion comprising sides of a crevice in the base material or in the release sheet, respectively, which are raised beyond the surface of the base material or the release sheet, respectively,
said crevice has an opening at a raising end of said raised portion,
said main used portion is provided in a central portion in a width direction or said adhesive layer, and
said portion other than the main used portion is provided on both side portions, in the width direction, of said adhesive layer.

9. The laminate sheet according to claim 8, wherein
the center portion in the width direction of said adhesive layer is the main used portion of said adhesive layer, and said raised portion is formed on both end portions in the width direction of said base material or said release sheet.

10. The laminate sheet according to claim 8, wherein
said raised portion is formed so that the planar shape thereof is angled relative to the longitudinal direction of said laminate sheet.

11. A laminate sheet roll
obtained by rolling up the laminate sheet according to claim 8.

* * * * *

UNITED STATES PATENT AND TRADEMARK OFFICE
CERTIFICATE OF CORRECTION

| | |
|---|---|
| PATENT NO. | : 8,323,761 B2 |
| APPLICATION NO. | : 11/884467 |
| DATED | : December 4, 2012 |
| INVENTOR(S) | : Takehito Nakayama et al. |

It is certified that error appears in the above-identified patent and that said Letters Patent is hereby corrected as shown below:

In the Claims:

Column 16, Claim 4, line 10, Claim 5, line 13, Claim 6, line 19 and Claim 7, line 25, for the claim reference numeral '1', each occurrence, should read -3-.

Signed and Sealed this
Tenth Day of September, 2013

Teresa Stanek Rea
*Acting Director of the United States Patent and Trademark Office*